(12) United States Patent
Scalabrino et al.

(10) Patent No.: US 9,311,087 B2
(45) Date of Patent: Apr. 12, 2016

(54) STICKY BIT UPDATE WITHIN A SPECULATIVE EXECUTION PROCESSING ENVIRONMENT

(71) Applicant: ARM LIMITED, Cambridge (GB)

(72) Inventors: Luca Scalabrino, Sophia Antipolis (FR); Cédric Denis Robert Airaud, Sophia Antipolis (FR); Guillaume Schon, Sophia Antipolis (FR); Frederic Jean Denis Arsanto, Sophia Antipolis (FR)

(73) Assignee: ARM Limited, Cambridge (GB)

( * ) Notice: Subject to any disclaimer, the term of this patent is extended or adjusted under 35 U.S.C. 154(b) by 648 days.

(21) Appl. No.: 13/724,046

(22) Filed: Dec. 21, 2012

(65) Prior Publication Data

US 2014/0181485 A1    Jun. 26, 2014

(51) Int. Cl.
*G06F 15/00* (2006.01)
*G06F 15/76* (2006.01)
*G06F 9/30* (2006.01)
*G06F 9/38* (2006.01)

(52) U.S. Cl.
CPC .......... *G06F 9/30087* (2013.01); *G06F 9/3804* (2013.01); *G06F 9/3842* (2013.01); *G06F 9/3865* (2013.01)

(58) Field of Classification Search
CPC ........................................................ G06F 9/38
USPC ........................................................ 712/220
See application file for complete search history.

(56) References Cited

U.S. PATENT DOCUMENTS 6,484,251 B1 * 11/2002 McDonald et al. ............. 712/23
2007/0036007 A1 * 2/2007 Lann et al. ................ 365/189.09

OTHER PUBLICATIONS

C. Celio et al, "Design Space Exploration of ILP Engines Optimized for Embarassingly Sequential Codes" 13 pages.
K. Swaminathan, "Overview of the IA-64 Architecture" 23 pages.
M.S. Schmookler et al, "A Low-power, High-speed Implementation of a PowerPC™ Microprocessor Vector Extension" 8 pages.
D. Kroning, "Design and Evaluation of a RISC Processor with a Tomasulo Scheduler" Diplomarbeit, Jan. 1999, pp. 1-114.
T.N. Hicks et al, "POWER2 floating-point unit: Architecture and implementation" IBM J. Res. Develop. vol. 38, No. 5, Sep. 1994, pp. 525-536.
R.M. Jessani et al, "The floating-point unit of the PowerPC 603e microprocessor" IBM J. Res. Develop. vol. 40, No. 5, Sep. 1996, pp. 559-566.

* cited by examiner

*Primary Examiner* — Chun-Kuan Lee
(74) *Attorney, Agent, or Firm* — Nixon & Vanderhye P.C.

(57) ABSTRACT

A data processing apparatus 2 supports speculative execution and the use of sticky bits. A different version of a sticky bit is associated with each segment of the speculative program flow. The segments of the program flow are separated by speculation nodes corresponding to program instructions which may be followed by a plurality of different alternative program instruction serving as the next program instruction. When a speculation node is resolved, then the segments separated by that speculation node are merged and the sticky bit values for those two segments are merged.

18 Claims, 5 Drawing Sheets

| FPSCR | | |
|---|---|---|
| CC | Control | Sticky Bits |

Sticky Bit = 0 = initial value
= 1 = sticky value

STICKY BIT UPDATE WITHIN A SPECULATIVE EXECUTION PROCESSING ENVIRONMENT

BACKGROUND OF THE INVENTION

1. Field of the Invention

This invention relates to data processing systems. More particularly, this invention relates to data processing systems which support speculative execution.

2. Description of the Prior Art

It is known to provide processing systems which support speculative execution. In such systems a sequence of program instructions are executed. This sequence of program instructions may include instructions which can be followed by a plurality of alternative instructions serving as a next programme instruction. These correspond to a speculation nodes within the speculative sequence of program instructions being executed. Sequences of program instructions between speculation nodes are segments of program instructions. The speculation nodes may, for example, correspond to conditional branch instructions, load/store instructions, which may abort, or other instructions for which there is the possibility that more than one instruction can serve as the next program instruction to be executed. Speculative execution in this way is desirable as it assists in increasing instruction execution throughput, such as by facilitating deep instruction pipelines, out-of-order execution and other techniques promoting parallelism.

A technique which assists in supporting speculative execution is register renaming. When a register is written and it is not certain that non-speculative execution will reach that point, then a new physical register is mapped to the architectural register being written so that the old value within that register may be preserved within the system should it need to be restored. Such register renaming techniques will be familiar to those in this technical field and are effective in supporting speculative and out-of-order processing. A problem with such register renaming techniques which allocate a new register each time a speculative change is made to a register value is that large numbers of registers need to be provided—this corresponds to a disadvantageous resource overhead.

It is also known within some data processing systems to support sticky bits. Sticky bits are typically used as flags to represent the occurrence of events during a window of program execution. As an example, a sticky bit may be used to represent the occurrence of a particular exception condition during execution of any of a sequence of program instructions within a given window. A first outcome of the execution of an individual instruction may be that the exception does not occur and a second outcome of that execution of the instruction is that the exception does occur. In the case of the first outcome, the sticky bit is left unchanged independent of whether or not it has its initial value or its sticky value. In the case of the second outcome, the sticky bit is set to the sticky value independent of whether the sticky bit has its initial value or the sticky value. Thus, once the sticky bit is changed from the initial value to the sticky value by a second outcome for any of the instructions for which it is monitoring for the occurrence of exceptions, then the sticky bit will maintain the sticky value and indicate that an exception occurred within one of those instructions. Sticky bits may, for example, be used in monitoring for certain types of exceptional behaviour within floating point processing pipelines, but other uses of sticky bits are also possible within data processing systems in general.

Combining the use of sticky bits with register renaming may lead to a solution in which as each event can result in an outcome that changes the sticky bit value, a new register is allocated to represent that possible new sticky bit value for each event and each instruction. While such an approach does allow state to be restored if the speculation fails, it suffers from the disadvantage of consuming significant resource to store all of the potential different event outcomes.

Another possibility is that when an event occurs that can update the sticky bit, then speculation beyond that event is not permitted, so as to avoid the need to register rename in respect of sticky bit values. This approach has the disadvantage of restricting the amount of speculation that can be performed.

SUMMARY OF THE INVENTION

Viewed from one aspect the present invention provides an apparatus for processing data in response to program instructions having a program execution order, said apparatus comprising:

processing circuitry configured to perform processing operation in response to said program instructions;

sticky bit storage circuitry configured to store one or more sticky bits, each sticky bit having either an initial value or a sticky value and being subject to:
  (i) a first outcome of an event that leaves said sticky bit unchanged independent of whether said sticky bit has said initial value or said sticky value; and
  (ii) a second outcome of said event that leaves said sticky bit with said sticky value independent of whether said sticky bit has said initial value or said sticky value; and speculative execution control circuitry configured to control speculative execution of program instructions by said processing circuitry to follow a speculative sequence of program instructions including a plurality of segments of program instructions, each of said plurality of segments separated from one or more adjacent segments by a respective speculation node corresponding to a program instruction following which a plurality of alternative instructions may serve as a next program instruction to be executed, said speculative execution control circuitry controlling said speculative sequence of program instructions to use one of said alternative instructions as said next program instruction; wherein said sticky bit storage circuitry is configured to store separate versions of said sticky bit, each version corresponding to a value of said sticky bit associated one of said plurality of segments.

The present technique recognises that the speculative sequence of program instructions extending between speculation nodes and constituting a segment may have a single version of a sticky bit value associated with it and stored within sticky bit storage circuitry. Each such version of the sticky bit represents whether or not the second outcome occurred for any of the program instructions within that segment, but does not identify which individual instruction had that second outcome. In practice this is consistent with the typical intended purpose for the sticky bit, i.e. to indicate occurrence of a particular outcome within a window of events. The provision of different versions of the sticky bit allows execution to proceed beyond a speculation node while permitting state to be restored if the speculation is incorrect and also does not require as much storage resource as providing a separate storage of the sticky for every event.

The plurality of segments will typically extend from a first segment, corresponding to non-speculative execution, to one or more further segments, each corresponding to speculative execution. The first segment is separated by speculation node from the second segment and each subsequent segment is separated by a further speculation node from the next segment.

The speculative execution control circuitry may be configured to respond to resolution of speculation associated with a speculation node by merging the segments which were previously separated by that speculation node. When segments are merged in this way, then the versions of the sticky bit corresponding to those segments are also merged. The merging of the versions takes place by setting a new version to have the sticky value if either of the two previous versions have the sticky value and to set the new sticky bit to the initial value if neither of the two previous versions had the sticky value. It will be appreciated that in some embodiments merging of segments due to speculation node resolution could be restricted to only be allowed in-order, i.e. only the first segment should be merged with the second segment. However, in other embodiments it is possible that out-of-order speculation node resolution may be permitted and other segments could be merged ahead of the merging of the first segment with the second segment. Both of these possibilities are encompassed in the present techniques.

Each of the segments may be associated with a pointer value used to indicate a corresponding version of the sticky bit to be used for that segment. When such pointers are used and segments are merged, then the newly created segment adopts the pointer value closest to the pointer value for the first segment. The pointer values for the segments further away from the first segment than the two segments that have been merged are then all changed by a value corresponding to the step between pointer values so that they then follow in an unbroken sequence through from the first segment to the final segment.

The sticky bit storage circuitry may be configured to store the plurality of versions of the sticky bit within a sequence of different registers and upon the merging of segments any versions of the sticky bit corresponding to segments further from a first segment than the merged segment are moved between the different registers so as to maintain an unbroken sequence of versions of the sticky bit stored in adjacent registers, for example the registers could form part of a FIFO and the values could be shuffled toward the output when two versions of the sticky bit are merged as their corresponding segments are merged by resolution of the speculation node which separated those two segments.

The first segment is typically a non-speculative architectural value of the sticky bit. All the following segments correspond to speculative execution and the associated sticky bit values for those segments are speculative and may or may not be correct when the speculation nodes concerned are resolved.

As previously mentioned, the sticky bit may have a variety of different uses. One particular use is as a flag value with the different outcomes representing side effects of execution of program instructions, i.e. whether or not conditions such as overflows occurred that do not prevent further processing but are recorded by the sticky bit.

The use of the sticky bit as a flag in this way may find use when the processing circuitry is floating point processing circuitry and the flag indicates exception conditions arising during execution of floating point processing operations.

As well as the outcome of the events monitored serving to change or not change the sticky bit value, it is also possible to execute read program instructions and write programme instructions that access the sticky bit. Read program instructions of a target version of a sticky bit may be performed before speculative nodes preceding that target version are resolved and they return a sticky value if any version of the sticky bit extending from the target version to the first version has a sticky value and otherwise to return the initial value. The read program instruction thus effectively ORs all of the sticky bit values preceding it.

In the case of execution of a write program instruction to a target version the sticky bit, the speculation nodes preceding that target version must be resolved before that write can take place in order to avoid a write-after write-hazard or other hazard of a similar nature.

Viewed from another aspect the present invention provides an apparatus for processing data in response to program instructions having a program execution order, said apparatus comprising:

processing means for performing processing operation in response to said program instructions;

sticky bit storage means for store one or more sticky bits, each sticky bit having either an initial value or a sticky value and being subject to:
  (i) a first outcome of an event that leaves said sticky bit unchanged independent of whether said sticky bit has said initial value or said sticky value; and
  (ii) a second outcome of said event that leaves said sticky bit with said sticky value independent of whether said sticky bit has said initial value or said sticky value; and speculative execution control means for controlling speculative execution of program instructions by said processing means to follow a speculative sequence of program instructions including a plurality of segments of program instructions, each of said plurality of segments separated from one or more adjacent segments by a respective speculation node corresponding to a program instruction following which a plurality of alternative instructions may serve as a next program instruction to be executed, said speculative execution control means controlling said speculative sequence of program instructions to use one of said alternative instructions as said next program instruction; wherein said sticky bit storage means stores separate versions of said sticky bit, each version corresponding to a value of said sticky bit associated one of said plurality of segments.

Viewed from a further aspect the present invention provides a method of processing data in response to program instructions having a program execution order, said method comprising the steps of:

performing processing operation in response to said program instructions;

storing one or more sticky bits, each sticky bit having either an initial value or a sticky value and being subject to:
  (i) a first outcome of an event that leaves said sticky bit unchanged independent of whether said sticky bit has said initial value or said sticky value; and
  (ii) a second outcome of said that leaves said sticky bit with said sticky value independent of whether said sticky bit has said initial value or said sticky value;

controlling speculative execution of program instructions to follow a speculative sequence of program instructions including a plurality of segments of program instructions, each of said plurality of segments separated from one or more adjacent segments by a respective speculation node corresponding to a program instruction following which a plurality of alternative instructions may serve as a next program instruction to be executed, said speculative execution control circuitry controlling said speculative sequence of program instructions to use one of said alternative instructions as said next program instruction; and storing separate versions of said sticky bit, each version corresponding to a value of said sticky bit associated one of said plurality of segments.

The above, and other objects, features and advantages of this invention will be apparent from the following detailed description of illustrative embodiments which is to be read in connection with the accompanying drawings.

BRIEF DESCRIPTION OF THE DRAWINGS

Embodiments of the invention will now be described, by a way of example only, with reference to the accompanying drawings.

DESCRIPTION OF THE EMBODIMENTS

Figure 1:
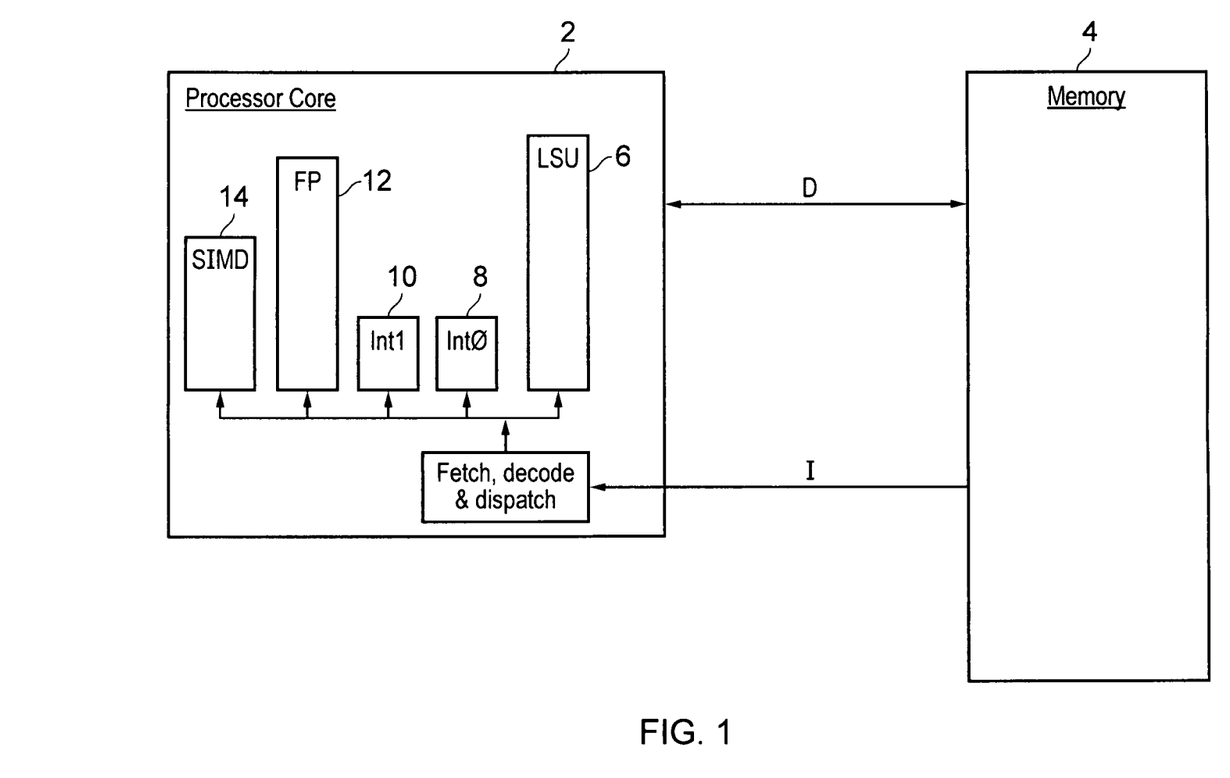
FIG. 1 schematically illustrates a processor core and a memory.

FIG. 1 schematically illustrates a processor core 2 coupled to a memory 4. Program instructions are fetched from the memory, at least partially decoded and then dispatched to one of a plurality of a processing pipelines, 6, 8, 10, 12, 14. These processing pipelines include a floating point pipeline 12. Some or all of the processing pipelines may support speculative program execution as will be described later. When an instruction is fetched from the memory 4, it is partially decoded to identify the processing pipeline which will process that instruction and then the instruction is despatched to that processing pipeline. The individual processing pipelines 6 to 14 may include individual issue queues which then schedule the issue of the instructions into that pipeline as and when it is possible to start their execution. The general arrangement illustrated in FIG. 1 will be familiar to those in this technical field and the general mechanisms for supporting such execution will also be familiar to those in this technical field.

Figure 2:
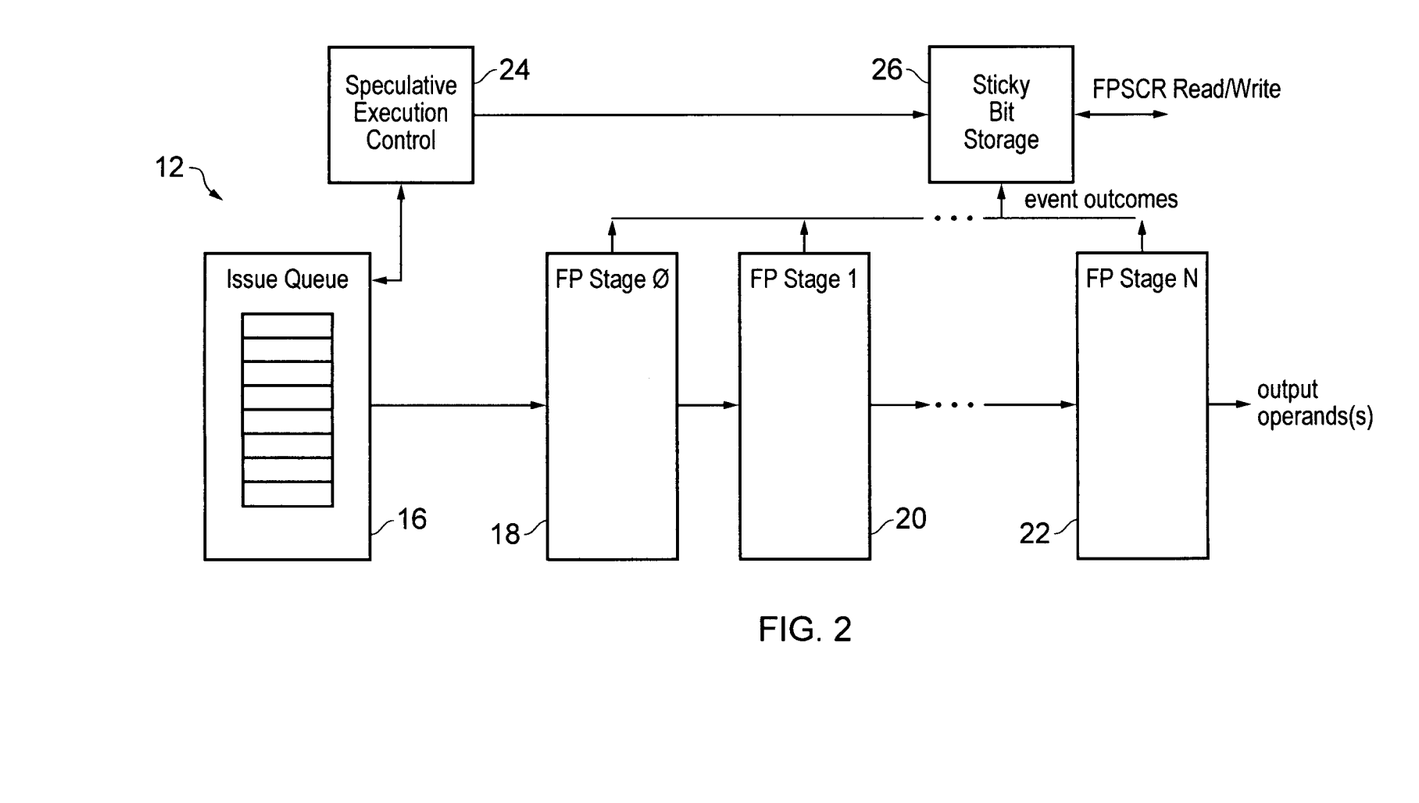
FIG. 2 schematically illustrates a floating point pipeline including circuits for supporting speculative execution and sticky bit storage.
Figure 3:
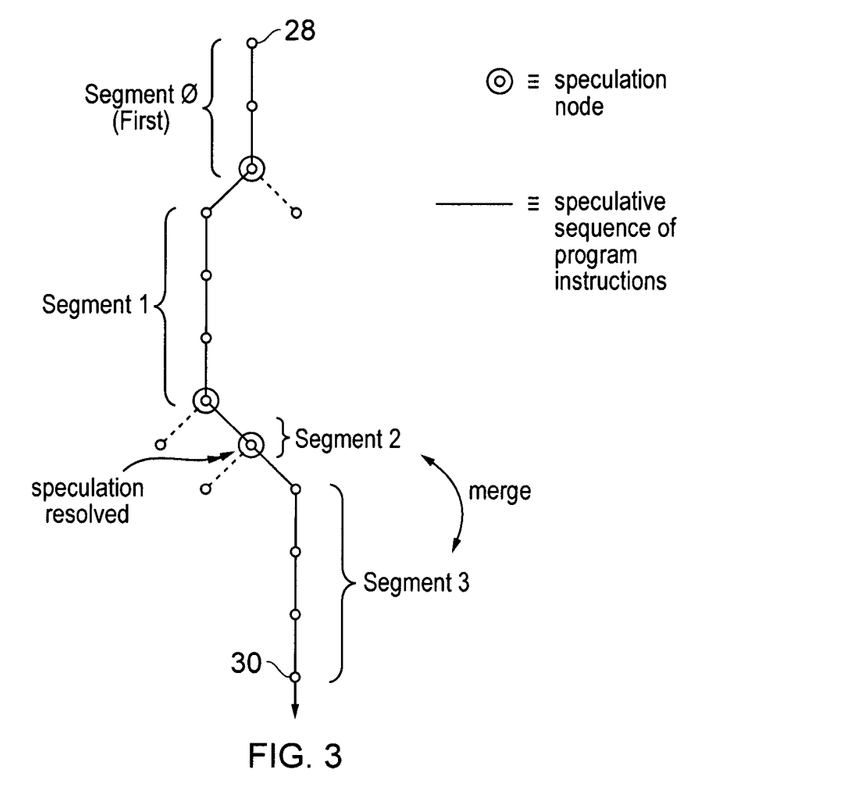
FIG. 3 schematically illustrates a speculative program flow including a plurality of speculation nodes and a plurality of segments of program instructions.

FIG. 2 schematically illustrates the floating point pipeline 12 including an issue queue 16 followed by a plurality of pipeline stages 18, 20, 22. Speculative execution control circuitry 24 is coupled to the issue queue and is used to control the speculative sequence of program instructions issued from the issue queue 16 to the following pipeline stages 18, 20, 22. The speculative sequence instructions may have a form as illustrated in FIG. 3 to include a plurality speculation nodes with segments of program instructions delimited by the speculation nodes. The speculative execution control circuitry 24 identifies speculation nodes and tracks these speculation nodes together with the resolution thereof. This permits the segments to also be tracked. When the speculative execution control circuitry 24 determines that a speculation node has resolved, the segments separated by the speculation node may be merged. This merging of segments is signalled to the sticky bit storage circuitry 26 within the pipeline 12 to trigger the merging of different versions of stored sticky bits as will be described later.

The sticky bit storage circuitry 16 is coupled to one or more of the pipeline stages 18, 20, 22 and serves to monitor whether or not certain exception conditions arise during execution of floating pointing instructions as they pass along the pipeline 12. The sticky bit can be considered to be a flag indicating that an exception condition (e.g. an overflow etc.) has occurred during processing in respect of a window of program instructions being monitored by that flag (i.e. between the flag being set to its initial value and a subsequent read of that flag to determine whether or not it has been changed to the sticky value). The sticky bit storage circuitry 26 also supports read program instructions and write program instructions which directly access the sticky bit. These read program instructions and write program instructions will have their own position within the speculative sequence program instructions and should access the appropriate version of the sticky bit to that position. A read program instruction of a sticky bit may be speculatively executed and acts to OR together all the preceding versions of the sticky bit and the version for that read program instruction to produce its read value of the sticky bit. In the case of a write program instruction to the sticky bit, all of the preceding speculation nodes within the program flow should be resolved before that write is performed in order to avoid various data hazards, such as write-after-write.

FIG. 3 schematically illustrates a speculative programme flow. This speculative programme flow follows the solid line extending from a first program instruction 28 through a plurality of segments of the program flow until reaching a youngest speculative program instruction 30. At various positions along the speculative program flow there are disposed speculation nodes which correspond to program instructions which may be followed by a plurality of alternative different program instructions serving as the next program instruction to be executed. At each of the speculation nodes, the speculation execution control circuitry 24 makes an assumption (prediction) as to which will be the next program instruction to be executed and the speculative program flow proceeds based upon this assumption. It may be that this assumption is not correct and accordingly state needs to be preserved such that the processor may be restored to the condition at which the incorrect speculation occurred and then the correct program flow followed.

When the speculation execution control circuitry 24 resolves the speculative condition or conditions associated with a speculation node, then the two segments separated by that speculation node may be merged. In the example illustrated, Segment 2 and Segment 3 are separated by a speculation node which is then resolved such that those two segments may be merged. The new merged segment will become Segment 2. Any following segments, if present, would then be renumbered so as to follow sequentially on from Segment 2. Pointers to any versions of sticky bit values would also be updated at this time.

In the example illustrated in FIG. 3, the speculation node resolved is not the first speculation node in the speculative program flow. Thus, the example of FIG. 3 represents out-of-order speculation node resolution. In other embodiments, the speculative execution control circuitry 24 may be simplified and constrained such that it is only able to resolve the speculation nodes in order such that the first speculation node in the speculative program flow at any given time is the only candidate speculation node for resolution.

Figure 4:
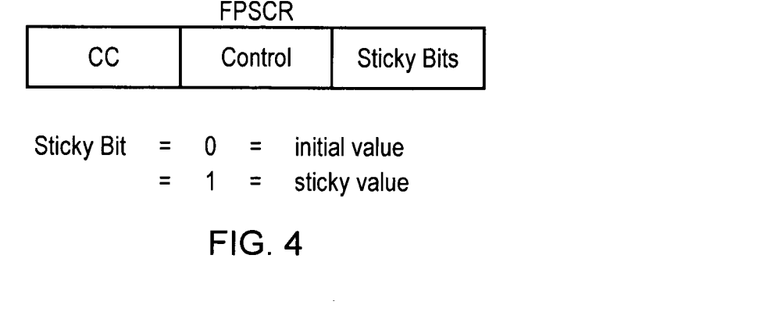
FIG. 4 schematically illustrates a register including one or more sticky bits indicating the occurrence of certain exception event outcomes for floating point instructions.

FIG. 4 schematically illustrates a register FPSCR associated with the floating point pipeline 12 including various fields such as a condition code field, a control field and a field of sticky bits. These sticky bits may be stored in their own sticky bit storage circuitry 26. There may be one or more sticky bits within the register. Each of the sticky bits has the property that it is written to an initial value (e.g. "0") and then is changed to a sticky value (e.g. "1") whenever a particular outcome of an event is detected within one of the stages of the processing pipeline 12. An example may be a sticky bit that monitors for an exception, such as an overflow. The stick bit would initially be written and set to a value of "0". As processing proceeded the sticky bit would be updated as a side effect of that processing (i.e. without requiring a specific write program instruction to the register) to change the sticky value from "0" to "1" (the sticky value) if an overflow occurred. Thus, the sticky bit may be used to monitor for events occurring within a window comprising a plurality of program instructions or processing operations. The sticky bit is set to the initial value at the start of the window. The sticky bit is read at the end of the window. If the sticky bit has changed from the initial value to the sticky value when it is read, then this indicates that one or more of the processing operations within the window had an outcome which triggered the change of the sticky bit from the initial value to the sticky value. It will be appreciated that multiple such event outcomes may have taken place or only a single such outcome.

Figure 5:
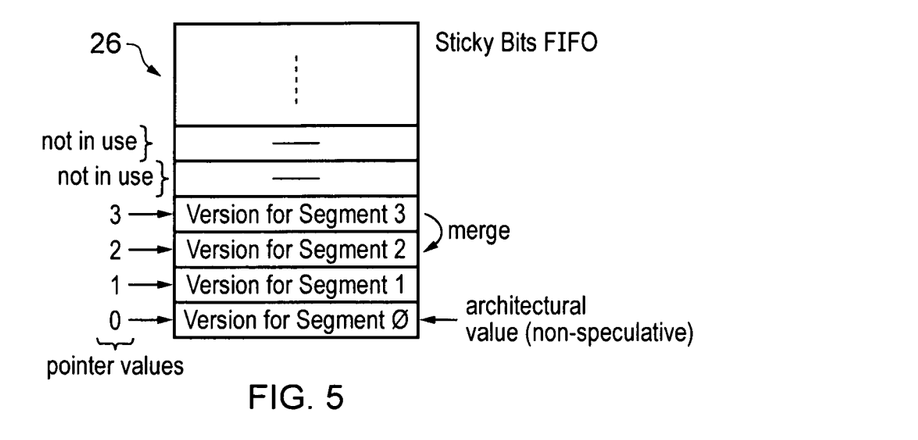
FIG. 5 schematically illustrates a sticky bit FIFO storing a plurality of versions of a sticky bit.

FIG. 5 schematically illustrates a portion of the sticky bit storage circuitry 26 in the form of a sticky bit FIFO. This FIFO may be considered as comprising a plurality of registers each storing a version of the sticky bit for a respective segment of the speculative program flow. Each of these versions has a pointer value associated with it which may be recorded by the speculative execution control circuitry 24 and used to retrieve/access the appropriate version of the sticky bit for a particular program instruction. As the number of segments is extended, new registers are allocated to new versions of the sticky bit building up within the FIFO. When speculation nodes are resolved, then segments merge and, as illustrated in FIG. 5, two versions of the sticky bit are merged (in this example the versions for Segment 3 and Segment 2 as in FIG. 3). The version of the sticky bit corresponding to the first segment is non-speculative and corresponds to an architectural value of the sticky bit at that point within the program flow.

Figure 6:
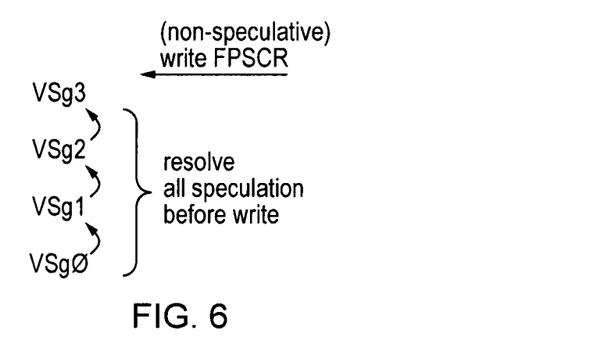
FIG. 6 schematically illustrates a write program instruction writing a sticky bit value.

FIG. 6 schematically illustrates a plurality of versions of sticky bits subject to a write program instruction to the sticky bit at a point in the program flow corresponding to the version of the sticky bit for Segment 3. In this case, all of the preceding speculation nodes must be resolved before that write program instruction can be performed. As each of these speculation nodes is resolved, the versions of the sticky bits separated by the speculation node will be merged until finally only a single version of the sticky bit remains corresponding to a correct architectural version. The write program instruction is then performed on this architectural version of the sticky bit.

Figure 7:
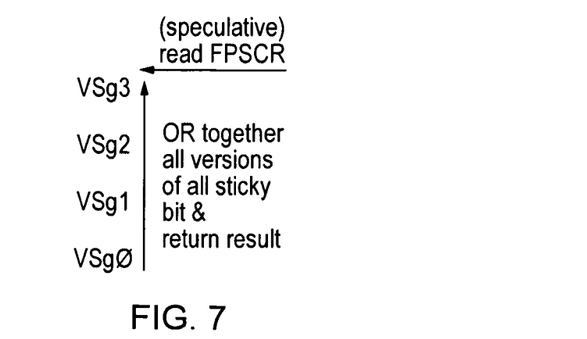
FIG. 7 schematically illustrates a read program instruction reading a sticky bit value.

FIG. 7 schematically illustrates a read program instruction performed upon the sticky bit. This read program instruction is again positioned within the speculative program flow at a point corresponding to the version of the sticky bit for Segment 3. In this case the read program instruction may be speculatively executed with the speculation nodes still outstanding. The result returned for the read program instruction is determined by ORing together all of the preceding versions of the sticky bit held within the sticky bit memory 26.

Figure 8:
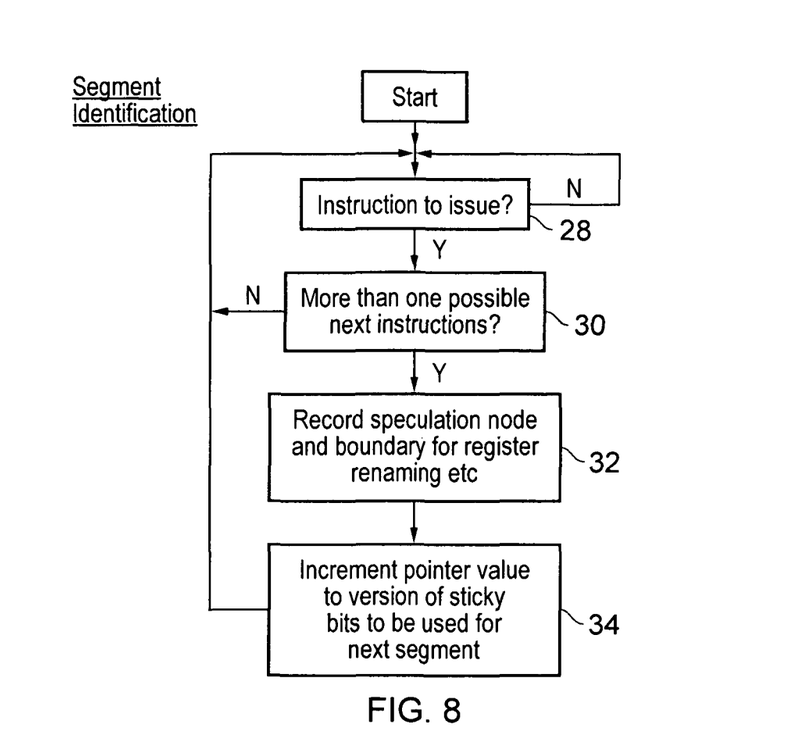
FIG. 8 is a flow diagram schematically illustrating segment identification within speculative program flow used to allocate pointers and versions of sticky bits to be used for different segments.

FIG. 8 schematically illustrates the action of the speculative execution control circuitry 24 in identifying different segments and controlling use of different versions of the sticky bit. At step 28, processing waits until there is an instruction to be issued. Step 30 determines whether or not there is more than one possible next instruction. Step 30 accordingly recognises speculation nodes. An example of an instruction with more than one possible following instruction would be a conditional branch instruction or a load/store instruction which could be the subject of a memory abort (and in so followed by abort handling instructions). If step 30 identifies a speculation node, then step 32 records the occurrence of that speculation node and sets up a boundary for register renaming and other speculative processing and out-of-order processing mechanisms to use. Step 34 then increments the pointer value to the version of the sticky bit to be used for the next segment within the speculative program flow. Thus, for example, if the system at stage 28 was currently executing within a Segment using a pointer value "2" and then a speculation node is identified, step 34 would change to a pointer value of "3" and subsequent event outcomes would impact upon the version of the sticky bit corresponding to the point value of "3" rather than that of the previous segment, namely "2".

Figure 9:
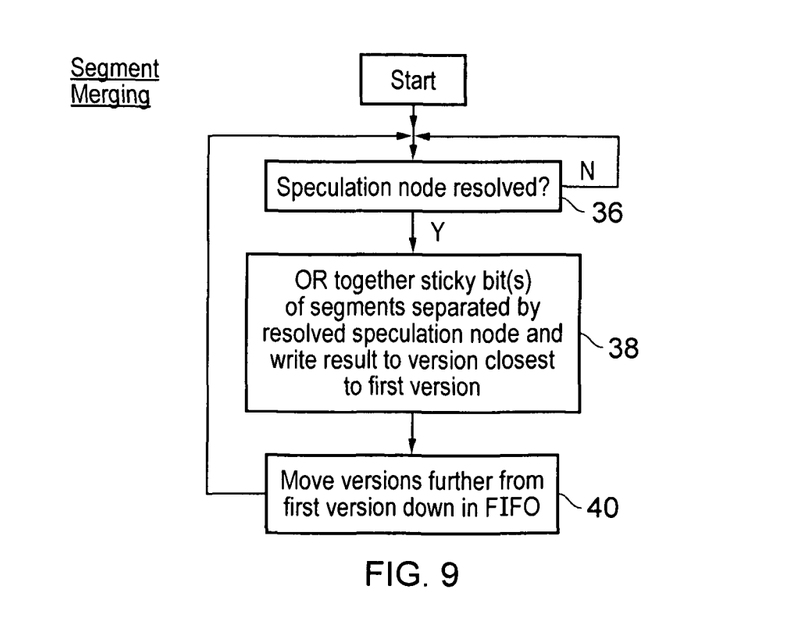
FIG. 9 is a flow diagram illustrating segment merging as a consequence of speculation node resolution.

FIG. 9 schematically illustrates segment merging. Step 36 waits until a speculation node is resolved. Processing then proceeds to step 38 where the sticky bits for the segments separated by the now resolved speculation node are merged together with the resulting merged sticky bits being written to the version of the sticky bit closest to the first version within the sequence of versions of the sticky bit. The pointer values for the various segments are also updated to reflect the merging. Step 40 serves to move any following versions of the sticky bit between register positions within the FIFO so as to preserve an unbroken sequence of registers used for the different versions of the sticky bit.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data in response to program instructions having a program execution order, said apparatus comprising:
   processing circuitry configured to perform processing operation in response to said program instructions;
   sticky bit storage circuitry configured to store one or more sticky bits, each sticky bit having either an initial value or a sticky value and being subject to:
   (i) a first outcome of an event that leaves said sticky bit unchanged independent of whether said sticky bit has said initial value or said sticky value; and
   (ii) a second outcome of said event that leaves said sticky bit with said sticky value independent of whether said sticky bit has said initial value or said sticky value; and
   speculative execution control circuitry configured to control speculative execution of program instructions by said processing circuitry to follow a speculative sequence of program instructions including a plurality of segments of program instructions, each of said plurality of segments separated from one or more adjacent segments by a respective speculation node corresponding to a program instruction following which a plurality of alternative instructions may serve as a next program instruction to be executed, said speculative execution control circuitry controlling said speculative sequence of program instructions to use one of said alternative instructions as said next program instruction; wherein said sticky bit storage circuitry is configured to store separate versions of said sticky bit, each version corresponding to a value of said sticky bit associated one of said plurality of segments, and said speculative execution control circuitry is configured to respond to resolution of speculation associated with a speculation node corresponding to a condition that a correct one of said plurality of alternative program instruction was selected as said next program instruction to merge segments separated by said speculation node to form a merged segment; and said sticky bit storage circuitry is configured to respond to any merging of segments to merge respective versions of said sticky bit to form a merged sticky bit such that:
  (i) if both versions of said sticky bit have said initial value, then said merged sticky bit has said initial value; and
  (ii) if either or both of said versions of said sticky bit have said sticky value, then said merged version has said sticky value.

2. Apparatus as claimed in claim 1, wherein said plurality of segments extend from a first segment corresponding to non-speculative execution of a sequence of program instructions to one or more further segments each corresponding to speculative execution of a sequence of one or more program instructions.

3. Apparatus as claimed in claim 2, wherein each of said segments is associated with a pointer value indicating a corresponding version of said sticky bit to be used for that segment.

4. Apparatus as claimed in claim 2, wherein said version of said sticky bit corresponding to said first segment is a non-speculative architectural value of said sticky bit.

5. Apparatus as claimed in claim 1, wherein each of said segments is associated with a pointer value indicating a corresponding version of said sticky bit to be used for that segment and when segments are merged, then said pointer value for said merged segment is the pointer value used by a segment that was merged and was previously closest to said first segment within said speculative program flow.

6. Apparatus as claimed in claim 5, wherein pointer values for any segments following said merged segment are changed so as to follow in sequence from said pointer value for said merged segment.

7. Apparatus as claimed in claim 1, wherein said sticky bit storage circuitry is configured to store said plurality of versions of said sticky bit within a sequence of different registers and upon said merging of segments, any versions of said sticky bit corresponding to segments further from a first segment than said merged segment are moved between said different registers to maintain an unbroken sequence of versions of said sticky bit stored in a sequence of different registers.

8. Apparatus as claimed in claim 1, wherein said processing circuitry is configured to respond to execution of a read program instruction of a target version of said sticky bit by returning a sticky value for said stick bit if any version of said sticky bit extending from said target version of said sticky bit to a first version of said sticky bit has said sticky value and otherwise by returning said initial value.

9. Apparatus as claimed in claim 1, wherein said processing circuitry is configured to respond to execution of a write program instruction of a target version of said sticky bit by triggering said speculative execution control circuitry to resolve all speculation associated with speculation nodes preceding a segment of said target version within said speculative sequence of program instructions such that said sticky bit value returned is not subject to any speculation.

10. Apparatus as claimed in claim 1, wherein said sticky bit is a flag value and said first outcome and said second outcome are side effects of execution of program instructions.

11. Apparatus as claimed in claim 1, wherein processing circuitry is floating point processing circuitry configured to perform floating point processing operations and said sticky bit is a flag indicating exception conditions arising during execution of said floating point processing operations.

12. Apparatus for processing data in response to program instructions having a program execution order, said apparatus comprising:
  processing means for performing processing operation in response to said program instructions;
  sticky bit storage means for store one or more sticky bits, each sticky bit having either an initial value or a sticky value and being subject to:
    (i) a first outcome of an event that leaves said sticky bit unchanged independent of whether said sticky bit has said initial value or said sticky value; and
    (ii) a second outcome of said event that leaves said sticky bit with said sticky value independent of whether said sticky bit has said initial value or said sticky value; and
  speculative execution control means for controlling speculative execution of program instructions by said processing means to follow a speculative sequence of program instructions including a plurality of segments of program instructions, each of said plurality of segments separated from one or more adjacent segments by a respective speculation node corresponding to a program instruction following which a plurality of alternative instructions may serve as a next program instruction to be executed, said speculative execution control means controlling said speculative sequence of program instructions to use one of said alternative instructions as said next program instruction; wherein
  said sticky bit storage means stores separate versions of said sticky bit, each version corresponding to a value of said sticky bit associated one of said plurality of segments, and
  said speculative execution control means is configured to respond to resolution of speculation associated with a speculation node corresponding to a condition that a correct one of said plurality of alternative program instruction was selected as said next program instruction to merge segments separated by said speculation node to form a merged segment; and
  said sticky bit storage means is configured to respond to any merging of segments to merge respective versions of said sticky bit to form a merged sticky bit such that:
    (i) if both versions of said sticky bit have said initial value, then said merged sticky bit has said initial value; and
    (ii) if either or both of said versions of said sticky bit have said sticky value, then said merged version has said sticky value.

13. A method of processing data in response to program instructions having a program execution order, said method comprising the steps of:
performing processing operation in response to said program instructions;
storing one or more sticky bits, each sticky bit having either an initial value or a sticky value and being subject to:
(i) a first outcome of an event that leaves said sticky bit unchanged independent of whether said sticky bit has said initial value or said sticky value; and
(ii) a second outcome of said that leaves said sticky bit with said sticky value independent of whether said sticky bit has said initial value or said sticky value;
controlling speculative execution of program instructions to follow a speculative sequence of program instructions including a plurality of segments of program instructions, each of said plurality of segments separated from one or more adjacent segments by a respective speculation node corresponding to a program instruction following which a plurality of alternative instructions may serve as a next program instruction to be executed, said speculative execution control circuitry controlling said speculative sequence of program instructions to use one of said alternative instructions as said next program instruction;
storing separate versions of said sticky bit, each version corresponding to a value of said sticky bit associated one of said plurality of segments;
in response to resolution of speculation associated with a speculation node corresponding to a condition that a correct one of said plurality of alternative program instruction was selected as said next program instruction, merging segments separated by said speculation node to form a merged segment; and
in response to any merging of segments, merging respective versions of said sticky bit to form a merged sticky bit such that:
(i) if both versions of said sticky bit have said initial value, then said merged sticky bit has said initial value; and
(ii) if either or both of said versions of said sticky bit have said sticky value, then said merged version has said sticky value.

14. A method as claimed in claim 13, wherein said plurality of segments extend from a first segment corresponding to non-speculative execution of a sequence of program instructions to one or more further segments each corresponding to speculative execution of a sequence of one or more program instructions.

15. A method as claimed in claim 14, wherein each of said segments is associated with a pointer value indicating a corresponding version of said sticky bit to be used for that segment.

16. A method as claimed in claim 13, wherein each of said segments is associated with a pointer value indicating a corresponding version of said sticky bit to be used for that segment and when segments are merged, then said pointer value for said merged segment is the pointer value used by a segment that was merged and was previously closest to said first segment within said speculative program flow.

17. A method as claimed in claim 16, wherein pointer values for any segments following said merged segment are changed so as to follow in sequence from said pointer value for said merged segment.

18. A method as claimed in claim 13, comprising storing said plurality of versions of said sticky bit within a sequence of different registers and upon said merging of segments said versions of said sticky bit, any versions of said sticky bit corresponding to segments further from a first segment than said merged segment are moved between said different registers to maintain an unbroken sequence of versions of said sticky bit stored in a sequence of different registers.

* * * * *